(12) United States Patent
Nishida

(10) Patent No.: US 8,670,414 B2
(45) Date of Patent: Mar. 11, 2014

(54) MOBILE COMMUNICATION SYSTEM INCLUDING THE RADIO ACCESS NETWORK NOT SUPPORTING CIRCUIT SWITCHING (CS) AND THE RADIO ACCESS NETWORK SUPPORTING CS

(75) Inventor: Katsutoshi Nishida, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/813,478

(22) PCT Filed: Jul. 29, 2011

(86) PCT No.: PCT/JP2011/067473
§ 371 (c)(1),
(2), (4) Date: Apr. 11, 2013

(87) PCT Pub. No.: WO2012/017951
PCT Pub. Date: Feb. 9, 2012

(65) Prior Publication Data
US 2013/0208659 A1    Aug. 15, 2013

(30) Foreign Application Priority Data

Aug. 6, 2010 (JP) ............... P2010-178198
Aug. 18, 2010 (JP) ............... P2010-183497

(51) Int. Cl.
*H04L 12/28* (2006.01)
*H04J 1/16* (2006.01)

(52) U.S. Cl.
USPC ............ 370/331; 370/252; 370/352; 370/401

(58) Field of Classification Search
USPC .................. 370/252, 331, 352, 401
See application file for complete search history.

(56) References Cited

U.S. PATENT DOCUMENTS

| | | | |
|---|---|---|---|
| 6,795,444 B1 * | 9/2004 | Vo et al. ........................ | 370/401 |
| 2006/0258358 A1 * | 11/2006 | Kallio ........................... | 455/437 |

FOREIGN PATENT DOCUMENTS

| | | |
|---|---|---|
| JP | 2011-259017 A | 12/2011 |
| WO | 2010/052589 A2 | 5/2010 |

OTHER PUBLICATIONS

International Search Report issued in PCT/JP2011/067473 mailed Nov. 1, 2011 (2 pages).
Written Opinion issued in PCT/JP2011/067473 mailed Nov. 1, 2011 (5 pages).
3GPP TR 23.856 V0.4.1; "3rd Generation Partnership Project; Technical Specification Group Services and System Aspects; Single Radio Voice Call Continuity (SRVCC) enhancements; Stage 2 (Release 10)"; Mar. 2010; pp. 16-17, 37-39 (6 pages).
3GPP TS 23.216 V9.3.0; "3rd Generation Partnership Project; Technical Specification Group Services and System Aspects; Single Radio Voice Call Continuity (SRVCC); Stage 2 (Release 9)"; Mar. 2010 (41 pages).
Japanese Office Action for Application No. 2010-183497, mailed on 10125/2011 (5 pages).
International Preliminary Report on Patentability from PCT/JP2011/067473 issued on Mar. 12, 2013 (8 pages).

* cited by examiner (Continued)

*Primary Examiner* — John Pezzlo
(74) *Attorney, Agent, or Firm* — Osha Liang LLP

(57) ABSTRACT

The characteristic of a mobile communication system according to the present invention is that the mobile communication system includes the steps of: causing an MME in a visitor network of UE#1 to acquire SRVCC capability of the UE#1 and to notify an HSS of the SRVCC capability of the UE#1 in an attach process or location registration process of the UE#1; and causing an ATCF, which controls an ATGW, to acquire the SRVCC capability of the UE#1, in a registration process of the UE#1 with IMS.

10 Claims, 13 Drawing Sheets

FIG. 3

Table 5.2.1.1.1/1: Update Location Request

| Information element name | Mapping to Diameter AVP | Cat. | Description |
|---|---|---|---|
| IMSI | User-Name (See IETF RFC 3588 [4]) | M | This information element shall contain the user IMSI, formatted according to 3GPP TS 23.003 [3], clause 2.2. |
| Supported Features (See 3GPP TS 29.229 [9]) | Supported-Features | O | If present, this information element shall contain the list of features supported by the origin host. |
| Terminal Information (See 7.3.3) | Terminal-Information | O | This information element shall contain information about the user's mobile equipment. Within this Information Element, only the IMEI and the Software-Version AVPs shall be used on the S6a/S6d interface. |
| ULR Flags (See 7.3.7) | ULR-Flags | M | This Information Element contains a bit mask. See 7.3.7 for the meaning of the bits. |
| Visited PLMN Id (See 7.3.9) | Visited-PLMN-Id | M | This IE shall contain the MCC and the MNC, see 3GPP TS 23.003[3]. It may be used to apply roaming based features. |
| RAT Type (See 7.3.13) | RAT-Type | M | This Information Element contains the radio access type the UE is using. See section 7.3.13 for details. |
| SGSN number (See 7.3.102) | SGSN-Number | C | This Information Element contains the ISDN number of the SGSN, see 3GPP TS 23.003 [3]. It shall be present when the message is sent on the S6d interface and the SGSN supports LCS or SMS functionalities. It may be present when the message is sent on the S6a interface and the requesting node is a combined MME/SGSN. |
| Homogeneous Support of IMS Voice Over PS Sessions | Homogeneous-Support-of-IMS-Voice-Over-PS-Sessions | O | This Information Element, if present, indicates whether or not "IMS Voice over PS Sessions" is supported homogeneously in all TAs or RAs in the serving node (MME or SGSN or combined MME/SGSN). The value "SUPPORTED" indicates that there is support for "IMS Voice over PS Sessions" in all TAs or RAs. The value "NOT_SUPPORTED" indicates that theres is not support for "IMS Voice over PS Sessions" in any of the TAs or RAs. |
| V-GMLC address | GMLC-Address | C | This Information Element shall contain, if available, the IPv4 or IPv6 address of the V-GMLC associated with the serving node. |

FIG. 4

| Bit | Name | Description |
|---|---|---|
| 0 | Single-Registration-Indication | This bit, when set, indicates that the HSS shall send Cancel Location to the SGSN. An SGSN shall not set this bit when sending ULR. |
| 1 | S6a/S6d-Indicator | This bit, when set, indicates that the ULR message is sent on the S6a interface, i.e. the source node is an MME (or a combined MME/SGSN to which the UE is attached via E-UTRAN). This bit, when cleared, indicates that the ULR message is sent on the S6d interface, i.e. the source node is an SGSN (or a combined MME/SGSN to which the UE is attached via UTRAN or GERAN). |
| 2 | Skip Subscriber Data | This bit, when set, indicates that the HSS may skip subscription data in ULA. If the subscription data has changed in the HSS after the last successful update of the MME/SGSN, the HSS shall ignore this bit and send the updated subscription data. If the HSS effectively skips the sending of subscription data, the GPRS-Subscription-Data-Indicator flag can be ignored. |
| 3 | GPRS-Subscription-Data-Indicator | This bit, when set, indicates that the HSS shall include in the ULA command the GPRS subscription data, if available in the HSS; it shall be included in the GPRS-Subscription-Data AVP inside the Subscription-Data AVP (see 7.3.2). Otherwise, the HSS shall not include the GPRS-Subscription-Data AVP in the response, unless the Update Location Request is received over the S6d interface and there is no EPS subscription data stored for the subscriber, or when the subscription data is returned by a Pre-Rel-8 HSS (via an IWF). A standalone MME shall not set this bit when sending a ULR. |
| 4 | Node-Type-Indicator | This bit, when set, indicates that the requesting node is a combined MME/SGSN. This bit, when cleared, indicates that the requesting node is a single MME or SGSN; in this case, if the S6a/S6d-Indicator is set, the HSS may skip the check of those supported features only applicable to the SGSN, and consequently skip the download of the SMS related subscription data to a standalone MME. |
| 5 | Initial-Attach-Indicator | This bit, when set, indicates that the HSS shall send Cancel Location to the MME or SGSN if there is the MME or SGSN registration. |
| 6 | PS-LCS-Not-Supported-By-UE | This bit, when set, indicates to the HSS that the UE does not support neither UE Based nor UE Assisted positioning methods for Packet Switched Location Services. The MME or SGSN shall set this bit on the basis of the UE capability information and the access technology supported by the SGSN or MME. |
| 7 | SRVCC Support Indicator | This indicator indicates whether the mobile equipment supports the SRVCC. *This indicator may indicate that the mobile equipment does not support the SRVCC. |
| | | Bits not defined in this table shall be cleared by the sending MME or SGSN and discarded by the receiving HSS. |

FIG. 6

Table 6.1.2.2: S-CSCF registration/deregistration notification response

| Information element name | Description |
|---|---|
| Private User Identity / Private Service Identity (See 7.3 and 7.3a) | Private Identity. It shall be present if it is available when the HSS sends the response. It may be absent in the following error case: when the Server-Assignment-Type of the request is UNREGISTERED_USER and the received Public Identity is not known by the HSS. |
| Registration result (See 7.6) | Result of registration. Result-Code AVP shall be used for errors defined in the Diameter Base Protocol. Experimental-Result AVP shall be used for Cx/Dx errors. This is a grouped AVP which contains the 3GPP Vendor ID in the Vendor-Id AVP, and the error code in the Experimental-Result-Code AVP. |
| User Profile (See 7.7) | Relevant user profile. It shall be present when Server-Assignment-Type in the request is equal to NO-ASSIGNMENT, REGISTRATION, RE_REGISTRATION or UNREGISTERED_USER according to the rules defined in section 6.6. If the S-CSCF receives more data than it is prepared to accept, it shall perform the de-registration of the Private Identity with Server-Assignment-Type set to DEREGISTRATION_TOO_MUCH_DATA and send back a SIP 3xx or 480 (Temporarily Unavailable) response, which shall trigger the selection of a new S-CSCF by the I-CSCF, as specified in 3GPP TS 24.229 [8]. |
| Charging Information (See 7.12) | Addresses of the charging functions. It shall be present when the UserData AVP is sent to the SCSCF. When this parameter is included, either the Primary-Charging-Collection-Function-Name AVP or the Primary-Event-Charging-Function-Name AVP shall be included. All other elements shall be included if they are available. |
| Associated Private Identities | This AVP contains all Private Identities, which belong to the same IMS subscription as the Private Identity or Public Identity received in the SAR command. If the IMS subscription contains only single Private Identity this AVP shall not be present. |
| Loose-Route Indication | This AVP indicates to the S-CSCF that loose-route mechanism shall be applied to the public identities contained in the user profile received from the HSS. If the loose-route mechanim is required, this AVP shall be present and set to LOOSE_ROUTE_REQUIRED. If the Loose-Route mechanism is not required, this AVP may be either absent or present. If present, it shall be set to LOOSE_ROUTE_NOT_REQUIRED. |
| S-CSCF Restoration Information (See 7.21) | This information shall be present if it was stored by the S-CSCF in the HSS and Server-Assignment-Type is either UNREGISTERED_USER or NO_ASSIGNMENT. This information shall also be present if it was stored by the S-CSCF in the HSS and the SAR indicates it is related to a multiple registration and Server-Assignment-Type is REGISTRATION. |
| Associated Registered Private Identities (See 7.22) | This AVP contains all Private Identities that were registered with the Public Identity received in the SAR command. The HSS shall send this information element if the IMS Restoration Procedures are supported and the value of Server-Assignment-Type in the request is REGISTRATION or RE_REGISTRATION and there are other Private Identities different from the Private Identity received in the SAR command being registered with the Public Identity received in the SAR command. Otherwise, this AVP shall not be present. |
| S-CSCF Name (See 7.4) | Name of the assigned S-CSCF. This AVP shall be present, if the requesting S-CSCF name is different from the previously assigned S-CSCF name stored in the HSS. |
| SRVCC Support Indicator | This indicator indicates whether the mobile equipment supports the SRVCC. *This indicator may indicate that the mobile equipment does not support the SRVCC. |

MOBILE COMMUNICATION SYSTEM INCLUDING THE RADIO ACCESS NETWORK NOT SUPPORTING CIRCUIT SWITCHING (CS) AND THE RADIO ACCESS NETWORK SUPPORTING CS

TECHNICAL FIELD

The present invention relates to a mobile communication method and a mobile communication system.

BACKGROUND ART

Conventionally, a mobile communication system capable of accommodating a radio access network of 2G/3G scheme (UTRAN: Universal Terrestrial Radio Access Network or GERAN: GSM EDGE Radio Access Network), and a radio access network of LTE (Long Term Evolution) scheme (EU-TRAN: Evolved Universal Terrestrial Radio Access Network) has been known.

An "SRVCC (Single Radio Voice Call Continuity) scheme" is specified in 3GPP TS23.216. The SRVCC (Single Radio Voice Call Continuity) scheme is for switching a voice communication path between a UE (User Equipment) #1 and a UE#2 from a path via E-UTRAN or UTRAN (a path for VoIP (Voice over IP) communications) to a path via UTRAN/GERAN (a path for circuit-switched (CS: Circuit Switch) communications).

In addition, Alt.4 or Alt.11 of 3GPP TR23.856 v 0.4.1 and the like specifies an SRVCC scheme (hereinafter referred to as an improved SRVCC scheme) for switching a voice communication path between a UE#1 and a UE#2 from a path via E-UTRAN or UTRAN to a path via UTRAN/GERAN, with an MGW (Media Gateway) #1 in a visitor network of the UE#1 as an anchor point.

Such improved SRVCC scheme enables termination of a signal necessary for switching the voice communication path between the UE#1 and the UE#2 in the visitor network of the UE#1, and can reduce communication outage time due to back and forth transmission of such signal between the visitor network of the UE#1 and a home network of the UE#1, compared with the conventional SRVCC scheme.

Here, FIG. 12 shows an originating process from the UE#1 to the UE#2 in a mobile communication system which can use the above-mentioned SRVCC scheme and the improved SRVCC scheme. FIG. 13 shows a registration process with an IMS of the UE#1 in a mobile communication system which can use the above-mentioned SRVCC scheme and the improved SRVCC scheme.

SUMMARY OF THE INVENTION

Problems to be Solved by the Invention

However, in the originating process shown in FIG. 12, an ATCF (Access Transfer Control Function) cannot determine whether or not to set an ATGW (Access Transfer Gateway) as an anchor point for switching paths on the voice communication path between the UE#1 and the UE#2, based on "SRVCC capability of UE#1" indicating whether or not the UE#1 supports the SRVCC scheme. Thus, there is a problem that resources of the ATGW are wasted because the ATGW allocates the resources for the voice communication path between the UE#1 and the UE#2 even if the UE#1 does not support the SRVCC scheme.

In addition, in the registration process shown in FIG. 13, a determination cannot be made on whether or not to set the ATCF on a SIP signaling path based on the SRVCC capability of the UE#1. Thus, there was a problem that resources of the ATCF are wasted because the ATCF relays an SIP signal from the UE#1 even if the UE#1 does not support the SRVCC scheme.

Hence, the present invention has been made in view of the problems described above, and an object of the present invention is to provide a mobile communication method and a mobile communication system which can prevent resources of ATGW or ATCF from being wasted.

Means for Solving the Problem

A first characteristic of the present invention is a mobile communication method in a mobile communication system which includes a first radio access network not supporting circuit-switched communications, a second radio access network supporting circuit-switched communications, and a service control network, and which is capable of being set to switch a voice communication path between a first mobile station and a second mobile station from a path via the first radio access network to a path via the second radio access network in an anchor node in a visitor network of the first mobile station, the method including the steps of: causing a mobility management node in the visitor network to acquire capability of the first mobile station and to notify a subscriber management server of the capability of the first mobile station in an attach process or a location registration process of the first mobile station, and causing a control node which controls the anchor node to acquire the capability of the first mobile station in a registration process of the first mobile station with the service control network.

A second characteristic of the present invention is a mobile communication system comprising a first radio access network not supporting circuit-switched communications, a second radio access network supporting circuit-switched communications, and a service control network, the mobile communication system being capable of being set to switch a voice communication path between a first mobile station and a second mobile station from a path via the first radio access network to a path via the second radio access network in an anchor node in a visitor network of the first mobile station, wherein a mobility management node in the visitor network is configured to acquire capability of the first mobile station and notify a subscriber management server of the capability of the first mobile station, in an attach process or location registration process of the first mobile station, and a control node which controls the anchor node is configured to acquire the capability of the first mobile station in a registration process of the first mobile station with the service control network.

Effect of the Invention

As described above, according to the present invention, a mobile communication method and a mobile communication system which can prevent wasting of resources of the ATGW or ATCF can be provided.

BRIEF DESCRIPTION OF THE DRAWINGS

FIG. 3 is a view showing a signal configuration example of "Update Location Request" used in the mobile communication system according to the first embodiment of the present invention.

FIG. 4 is a view showing a configuration example of "ULR-Flags" contained in "Update Location Request" used in the mobile communication system according to the first embodiment of the present invention.

FIG. 6 is a view showing a signal configuration example of "Cx-put Resp/Cx-pull Resp" used in the mobile communication system according to the first embodiment of the present invention.

MODES FOR CARRYING OUT THE INVENTION (Mobile Communication System According to a First Embodiment of the Present Invention)

A mobile communication system according to a first embodiment of the present invention will be described with reference to FIG. 1 to FIG. 8.

The mobile communication system according to the embodiment accommodates E-UTRAN and UTRAN/GERAN.

Figure 1:
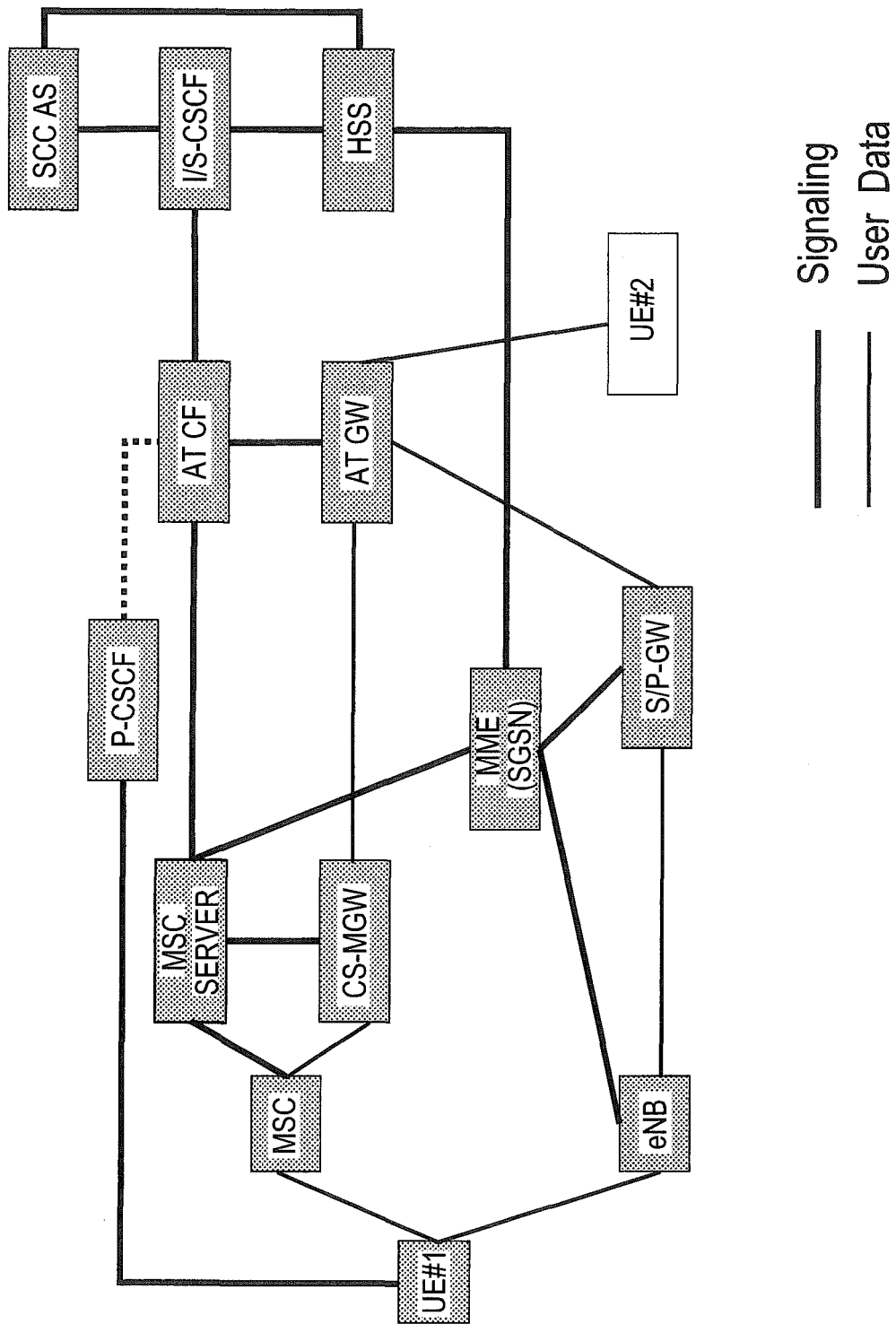
FIG. 1 is an overall configurational view of a mobile communication system according to a first embodiment of the present invention.

Specifically, as shown in FIG. 1, in a visitor network of an UE#1, the mobile communication system according to the embodiment includes an eNB (radio base station), RNC (Radio Network Controller, radio link control station, not shown), NodeB/BSS (radio base station, not shown), MME (Mobility Management Entity, mobility management node), SGW (Serving-Gateway, serving gateway device), P-GW (PDN-Gateway, PDN gateway device), P-CSCF (Proxy-Call Session Control Function), IBCF (Interconnection Border Control Function stated in TS23.228, not shown), MSC (Mobile-service Switching Center, circuit switching device), SGSN (Serving GPRS Support Node, packet switching device), MSC server, CS (Circuit Switch)-MGW, ATCF, ATGW, and the like.

In addition, in an IMS (IP Multimedia Subsystem), the mobile communication system according to the embodiment includes an SCC AS or IS-CSCF and the like.

Here, in the mobile communication system according to the embodiment, a voice communication path between the UE#1 and the UE#2 can be switched from a path via E-UTRAN or UTRAN (path for IMS VoIP communications) to a path via UTRAN/GERAN (path for circuit-switched communications), with the SRVCC scheme or improved SRVCC scheme.

In addition, in the improved SRVCC scheme, the ATGW is an anchor node configured to perform the switching described above, and the ATCF is a controller configured to control the ATGW.

In the following, operations of the mobile communication system according to the embodiment will be described with FIG. 2 to FIG. 8.

First, an attach (Attach) process of the UE#1 in the mobile communication system according to the embodiment will be described with reference to FIG. 2 to FIG. 4.

Figure 2:
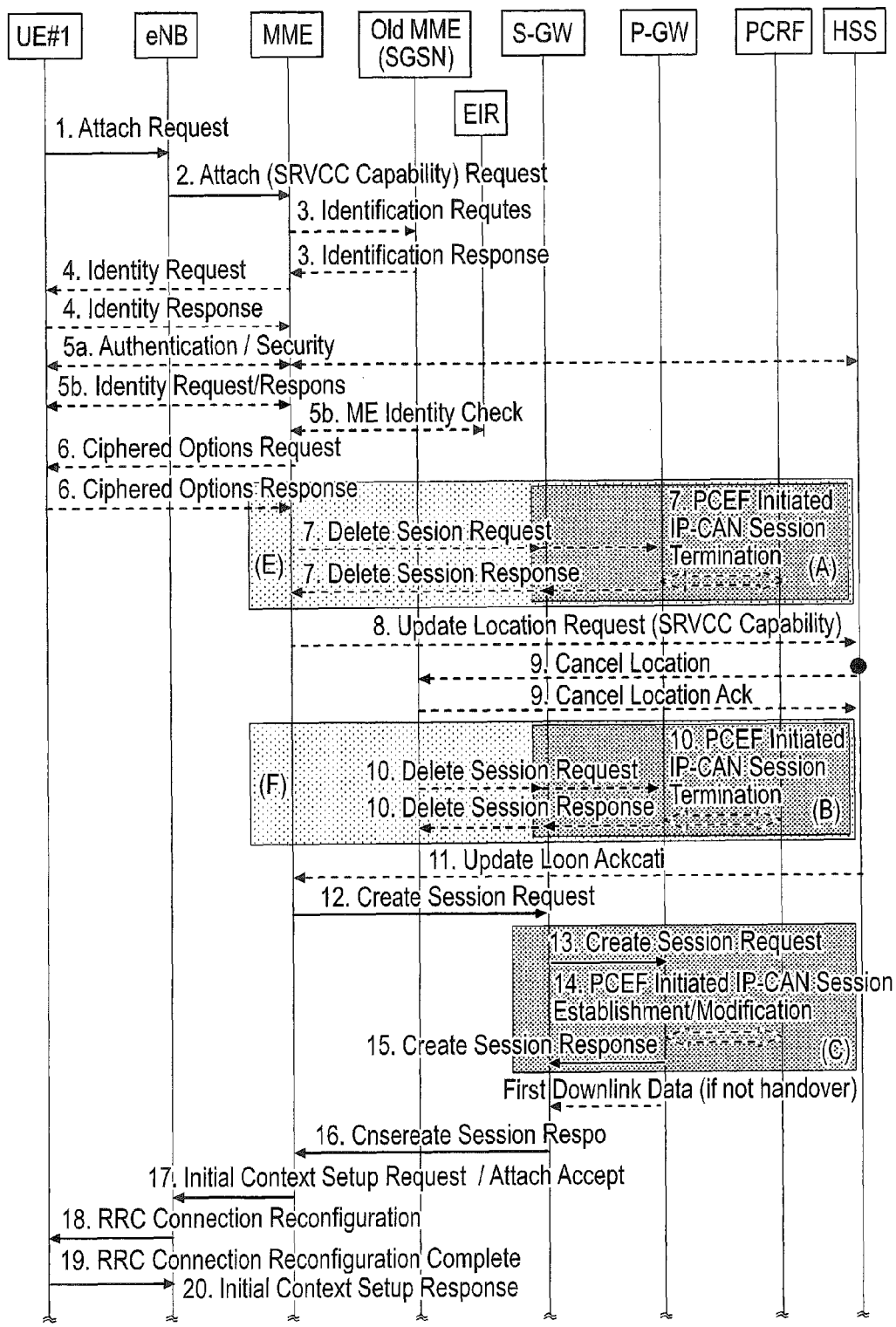
FIG. 2 is a sequence diagram describing operations of the mobile communication system according to the first embodiment of the present invention.

As shown in FIG. 2, an operation specified in TS23.401 of 3GPP is performed as the attach process of the UE#1 in the mobile communication system according to the embodiment.

Here, in Step 2, the MME acquires SRVCC capability of the UE#1 through "Attach Request" received from an eNB.

Note that such SRVCC capability of the UE#1 may be information indicating that the UE#1 supports the SRVCC scheme or information indicating that the UE#1 does not support the SRVCC scheme.

In addition, in Step 8, the MME notifies an HSS (Home Subscriber Server) of the SRVCC capability of the UE#1 through "Update Location Request".

The MME notifies the HSS of the SRVCC capability of the UE#1 by an information element "ULR-Flags (see FIG. 4)" in the "Update Location Request (see FIG. 3)" specified in TS29.272 of 3GPP, for example.

Here, a signal configuration example of the "Update Location Request" as shown in FIG. 3 and a configuration example of the "ULR-Flags" as shown in FIG. 4 are specified in TS29.272 of 3GPP.

In addition, a location registration process of the UE#1 in the mobile communication system according to the embodiment will be a similar process. In such a case, the MME may notify the HSS of the SRVCC capability of the UE#1 if the MME detects that the SRVCC capability of the UE#1 has been changed. Alternatively, the MME may notify the HSS of the SRVCC capability of the UE#1 whenever the MME performs the location registration process.

As such, the HSS is configured to acquire and store the SRVCC capability of the UE#1 in the attach process of the UE#1 or the location registration process of the UE#1.

Secondly, a registration process of the UE#1 with an IMS (IMS Registration procedure) in the mobile communication system according to the embodiment will be described with reference to FIG. 5 and FIG. 6.

Figure 5:
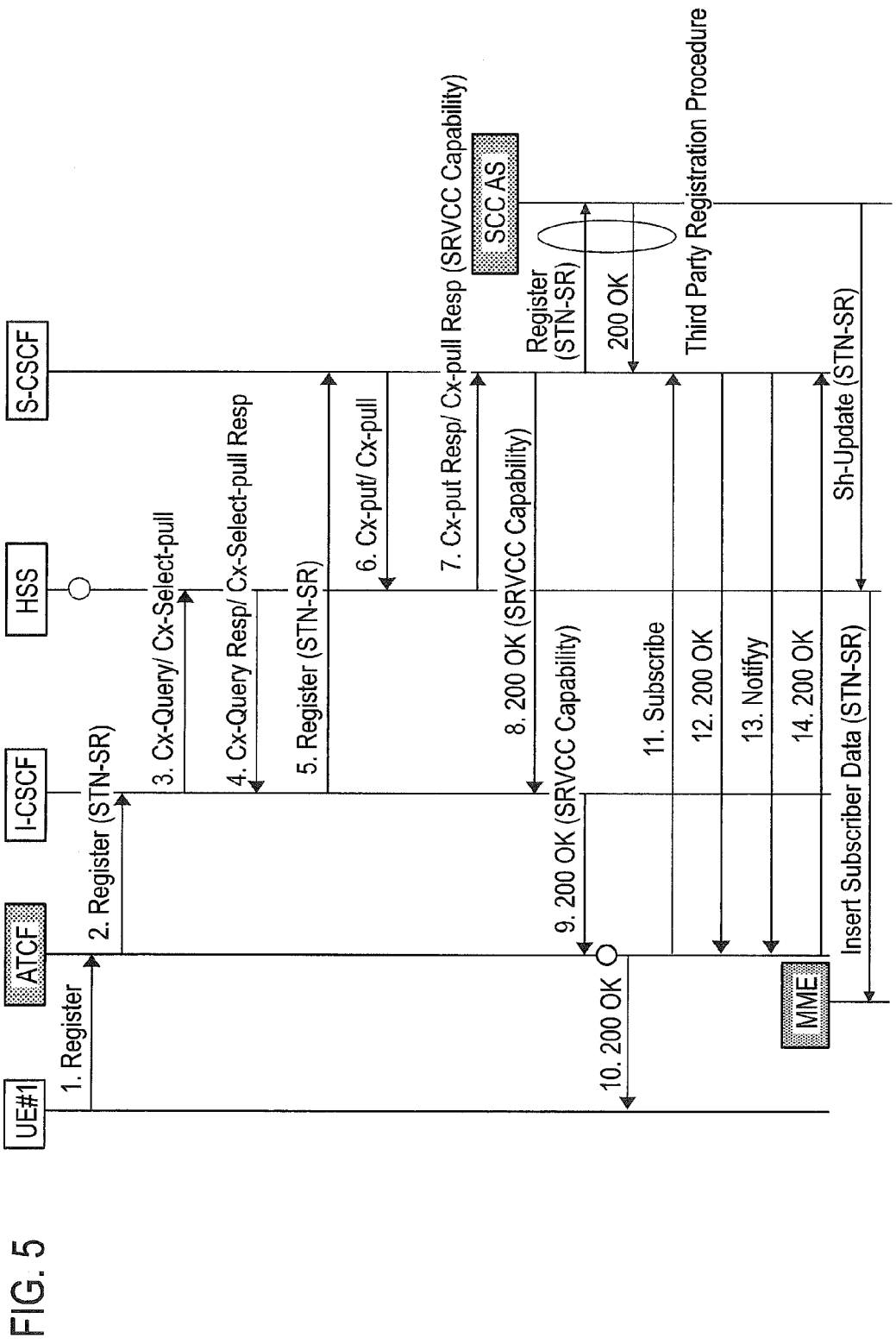
FIG. 5 is a sequence diagram describing operations of the mobile communication system according to the first embodiment of the present invention.

As shown in FIG. 5, operations specified in TS23.228 of 3GPP are performed as Steps 1 to 10 of the registration process of the UE#1 with the IMS in the mobile communication system according to the embodiment.

Here, "Register" transmitted in Step 1 and Step 2 may be transferred by way of the P-CSCF or IBCF.

In addition, in Step 7, the HSS notifies the S-CSCF of the SRVCC capability of the UE#1 via "Cx-putResp/Cx-pull-Resp".

The HSS notifies the S-CSCF of the SRVCC capability of the UE#1 through "Cx-put Resp/Cx-pull Resp (See FIG. 6)" specified in TS29.228 of 3GPP.

Here, the HSS may determine whether switching with the SRVCC scheme may be performed in a visitor network of the UE#1, considering a subscriber profile, operator policy and the like as well as the SRVCC capability of the UE#1 and notifies a determination result instead of the SRVCC capability of the UE#1. The HSS may also notify such a determination result together with the SRVCC capability of the UE#1. This will also be similar in Step 8 and Step 9 in the following.

Then, the S-CSCF notifies an I-CSCF of the SRVCC capability of the UE#1 through "200 OK" in Step 8, and the I-CSCF notifies the ATCF of the SRVCC capability of the UE#1 through "200 OK" in Step 9.

Alternatively, the S-CSCF may notify the ATCF of the SRVCC capability of the UE#1 through "200 OK" in Step 12 or notify the SRVCC capability of the UE#1 through "Notify" in Step 13.

In addition, the SRVCC capability of the UE#1 may be transmitted as a part of a subscriber profile or as independent information.

Thus, in the registration process of the UE#1 with the IMS, the ATCF is configured to acquire and store the SRVCC capability of the UE#1.

Here, in the registration process of the UE#1 with the IMS, a configuration may be such that a determination on whether or not to exclude the ATCF from a transfer path of an SIP signal (originating signal from the UE#1 or UE#2 or terminating signal from the UE#2 to the UE#1, for example) of the UE#1 is made based on the SRVCC capability of the UE#1.

Such a determination may be made by the ATCF or by a peripheral device such as the P-CSCF or IBCF and the like. In addition, if the ATCF is provided as a function of the peripheral device such as the P-CSCF or IBCF and the like, it may be set to exclude the ATCF from a process logic as an internal process of such a peripheral device.

Thirdly, an originating process from the UE#1 to the UE#2 in the mobile communication system according to the embodiment will be described with reference to FIG. 7.

Figure 7:
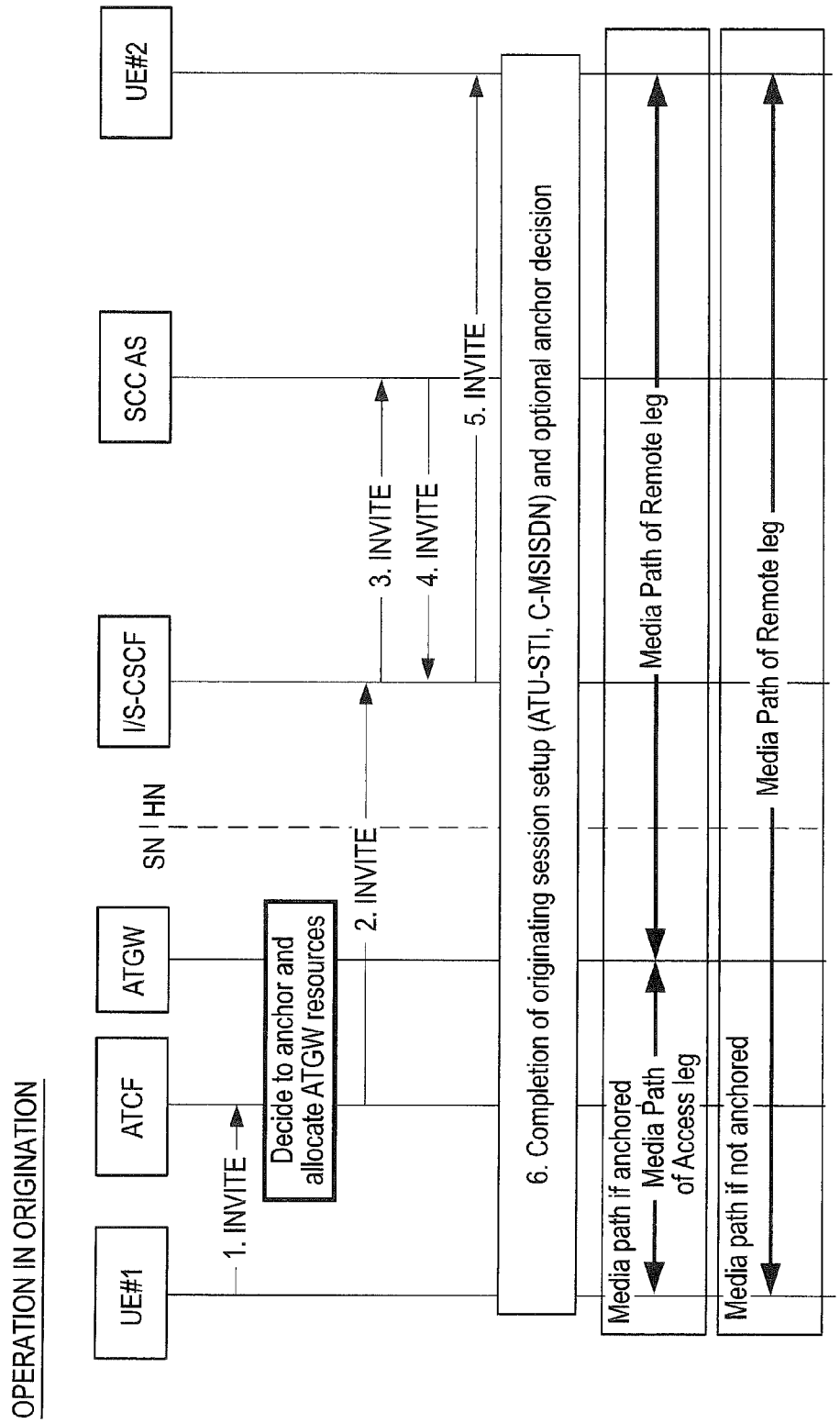
FIG. 7 is a sequence diagram describing operations of the mobile communication system according to the first embodiment of the present invention.

As shown in FIG. 7, in Step 1, the UE#1 transmits "INVITE" to the ATCF.

Receiving the "INVITE", the ATCF determines whether or not to set the ATGW as an anchor point for switching paths on the voice communication path between the UE#1 and the UE#2, based on the SRVCC capability of the UE#1 which the ATCF has stored.

Here, the ATCF may determine whether or not to set the ATGW as the anchor point for switching paths on the voice communication path between the UE#1 and the UE#2, considering not only the SRVCC capability of the UE#1 but also other factors (for example, whether or not the UE#1 is a roaming user, an operator policy in the visitor network of the UE#1, media capability of the UE#1, a subscriber profile of the UE#1, a communication type, information related to the UE#2 (home operator information, for example), and the like). In such a case, the ATCF may acquire the subscriber profile of the UE#1 through the IMS Registration procedure.

If the ATCF determines that the ATGW switches the voice communication path between the UE#1 and the UE#2 (i.e., applies the improved SRVCC scheme), the ATCF generates "INVITE" containing SDP (Session Description Protocol) information of the ATGW.

Such "INVITE" is transferred from the ATCF to the UE#2 by way of the I/S-CSCF and SCC AS in Steps 2 to 5.

In Step 6, a setting process for the voice communication path between the UE#1 and the UE#2 which goes through the ATGW is complete. Here, the SCC AS notifies the ATCF of ATU-STI (Access Transfer Update-Session Transfer Identifier) which enables routing to the SCC AS and C-MSISDN (Correlation MSISDN) which enables routing to the UE#1.

On the one hand, if the ATCF determines not to set the ATGW (i.e., not to apply the improved SRVCC scheme) as the anchor point for switching the voice communication path between the UE#1 and the UE#2, the ATCF performs a process based on the SRVCC scheme specified in TS23.216 of 3GPP.

The ATCF does not set the SDP information for the ATGW in the "INVITE" which is transmitted in Step 2, for example.

In such a case, in Step 6, a setting process for the voice communication path between the UE#1 and the UE#2 which does not go through the ATGW is complete. Here, the SCC AS may not notify the ATCF of the ATU-STI and C-MSISDN.

Fourthly, a terminating process from the UE#2 to the UE#1 in the mobile communication system according to the embodiment will be described with reference to FIG. 8.

Figure 8:
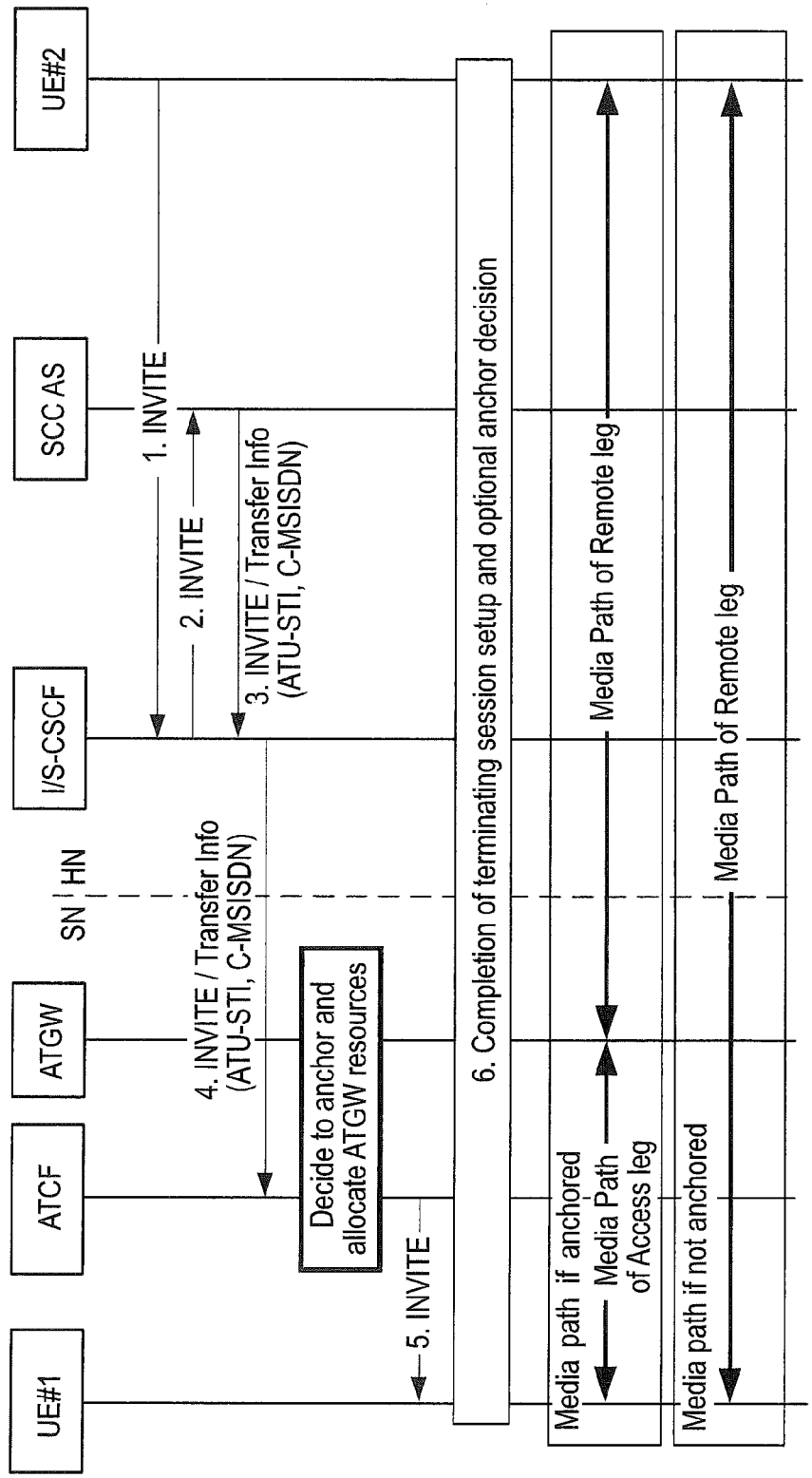
FIG. 8 is a sequence diagram describing operations of the mobile communication system according to the first embodiment of the present invention.

As shown in FIG. 8, the UE#2 transmits "INVITE" to the I/S-CSCF in Step 1, and the I/S-CSCF transmits the "INVITE" to the SCC AS in Step 2.

The SCC AS transmits "INVITE/Transfer Info" containing the above-mentioned ATU-STI and C-MSISDN to the I/S-CSCF in Step 3, and the I/S-CSCF transmits "INVITE/Transfer Info" containing the above-mentioned ATU-STI and C-MSISDN to the ATCF in Step 4.

Here, receiving the "INVITE/Transfer Info", the ATCF determines whether or not to set the ATGW as the anchor point for switching path on the voice communication path between the UE#1 and the UE#2, based on the SRVCC capability of the UE#1 which the ATCF has stored.

Here, the ATCF may also determine whether or not the ATGW switches the voice communication path between the UE#1 and the UE#2, considering not only the SRVCC capability of the UE#1 but also other factors (for example, whether or not the UE#1 is a roaming user, an operator policy in the visitor network of the UE#1, media capability of the UE#1, a subscriber profile of the UE#1, a communication type, information related to the UE#2 (home operator information, for example), and the like). In such a case, the ATCF may acquire the subscriber profile of the UE#1 through the IMS Registration procedure.

If the ATCF determines to set the ATGW (i.e., apply the improved SRVCC scheme) as the anchor point for switching the voice communication path between the UE#1 and the UE#2, it generates "INVITE" containing the SDP information of the ATGW.

Such "INVITE" is transferred from the ATCF to the UE#1 in Step 5.

The setting process for the voice communication path between the UE#1 and the UE#2 which goes through the ATGW is complete in Step 6.

On the one hand, if the ATCF determines not to set the ATGW (i.e., not to apply the improved SRVCC scheme) as the anchor point for switching the voice communication path between the UE#1 and the UE#2, the ATCF performs a process based on the SRVCC scheme specified in TS23.216 of 3GPP.

The ATCF does not set the SDP information of the ATGW in the "INVITE" which is transmitted in Step 5, for example.

In such a case, the setting process for the voice communication path between the UE#1 and the UE#2 which does not go through the ATGW is complete in Step 6.

With the mobile communication system according to the embodiment, the ATCF can acquire the SRVCC capability of the UE#1 in the registration process of the UE#1 with the INS. Since this makes it possible not to allocate the ATGW when the improved SRVCC scheme cannot be used in voice communications between the UE#1 and the UE#2, wasting of resources of the ATGW can be prevented. In addition, with the mobile communication system according to the embodiment, the ATCF can acquire the SRVCC capability of the UE#1 in the registration process of the UE#1 with the IMS. Since this allows the ATCF not to relay an SIP signal when the improved SRVCC scheme cannot be used in voice communications between the UE#1 and the UE#2, wasting of resources of the ATCF can be prevented. In such a case, since the ATGW is not allocated, either, wasting of the resources of the ATGW can also be prevented.

Modification 1

In the following, with reference to FIG. 9 and FIG. 10, a mobile communication systems according to Modification 1 of the first embodiment described above will be described with a focus on differences from the mobile communication system according to the first embodiment described above.

First, a registrant process of UE#1 with an IMS in the mobile communication system according to Modification 1 will be described with reference to FIG. 9.

Figure 9:
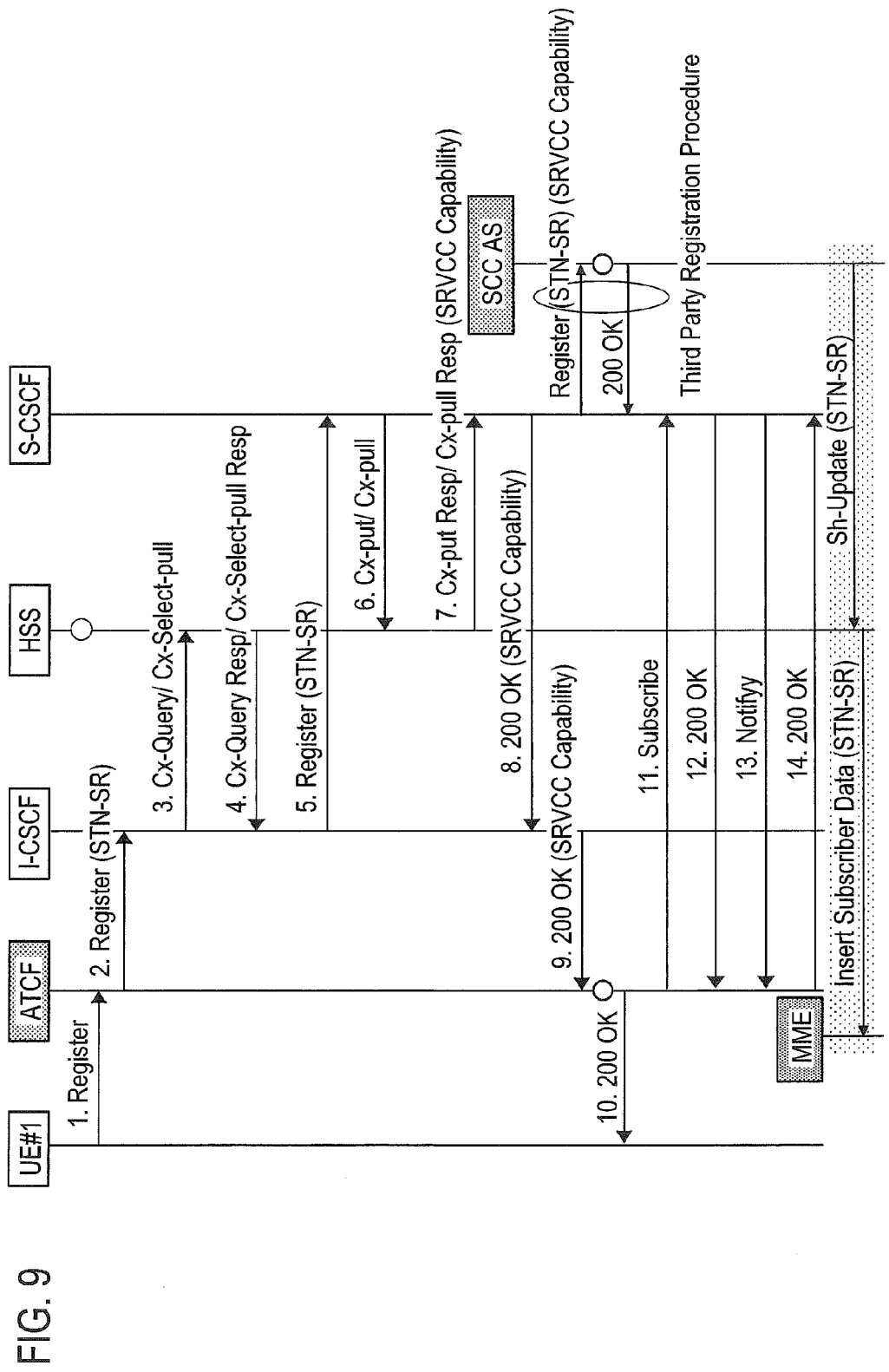
FIG. 9 is a sequence diagram describing operations of the mobile communication system according to the first embodiment of the present invention.

As shown in FIG. 9, operations from Steps 1 to 14 are the same as those from Steps 1 to 14 shown in FIG. 5.

In Step 8, after transmitting "200 OK" containing SRVCC capability of I/S-CSCFUE#1, an S-CSCF transmits "Register (STN-SR)" containing SRVCC capability of the UE#1 to an SCC AS.

Here, the SCC AS may acquire and store the SRVCC capability of the UE#1 from such "Register (STN-SR)" or acquire and store the SRVCC capability of the UE#1 from a subscriber profile (SPR).

Here, in Step 7, when receiving from an HSS a determination result on whether switching with the SRVCC scheme may be performed in a visitor network of the UE#1, the S-CSCF may notify such a determination result instead of the SRVCC capability of the UE#1 or notify such a determination result together with the SRVCC capability of the UE#1.

Then, the SCC AS transmits "200 OK" to the S-CSCF.

In addition, the SCC AS may determine whether or not to notify an MME of the STN-SR received in the "Register" signal via the HSS, based on the SRVCC capability of the UE#1.

Specifically, if the SCC AS determines that the UE#1 does not support the SRVCC scheme, the SCC AS may not transmit "Sh-Update" containing the STN-SR to the HSS.

Fourthly, a terminating process from the UE#2 to the UE#1 in the mobile communication system according to Modification 1 will be described with reference to FIG. 10.

Figure 10:
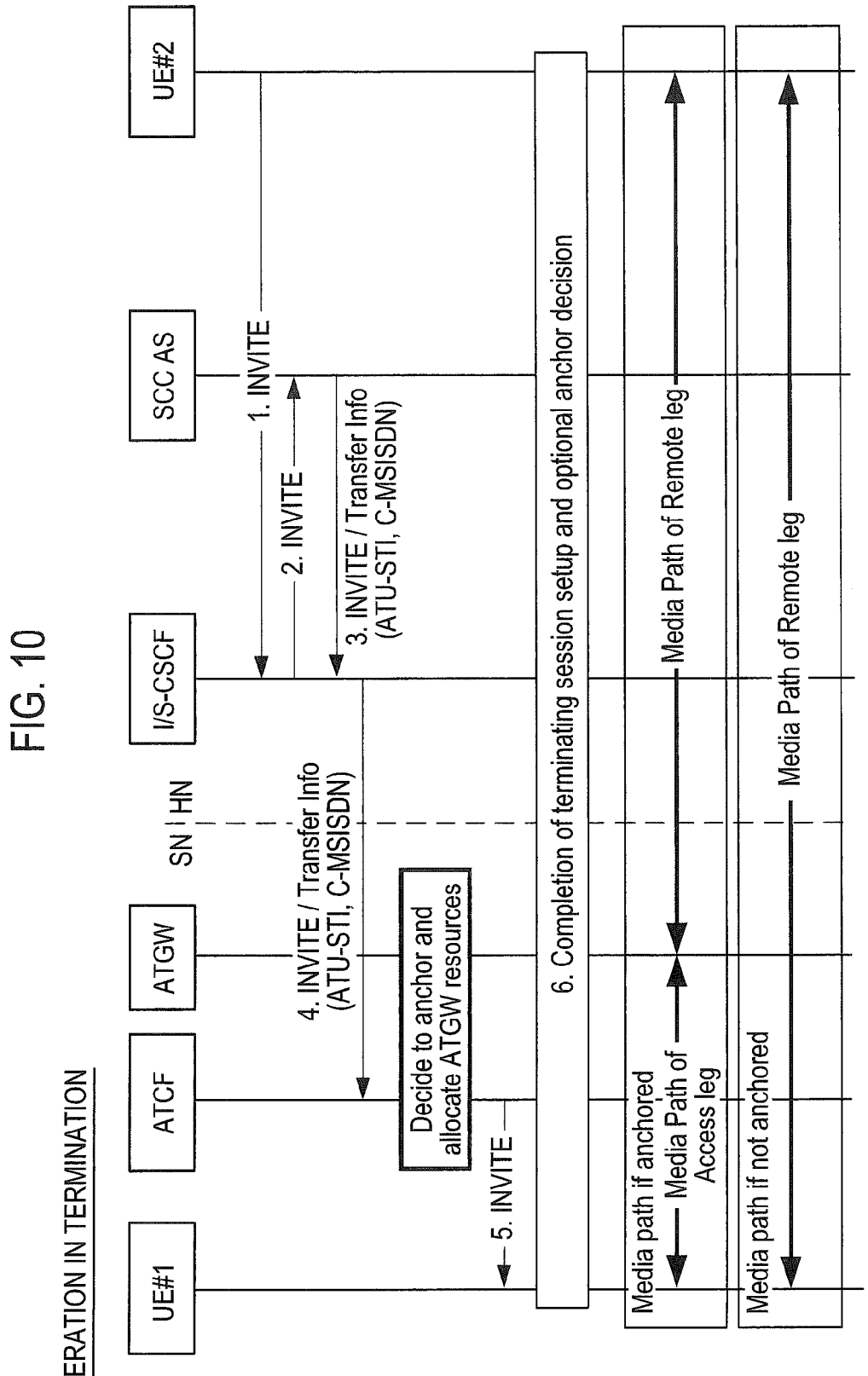
FIG. 10 is a sequence diagram describing operations of a mobile communication system according to Modification 1 of the present invention.

As shown in FIG. 10, the UE#2 transmits "INVITE" to the I/S-CSCF in Step 1, and the I/S-CSCF transmits the "INVITE" to the SCC AS in Step 2.

Here, the SCC AS determines whether or not to perform switching of a voice communication path between the UE#1 and the UE#2 as described above (i.e., whether or not to apply the improved SRVCC scheme) in the visitor network, based on the SRVCC capability of the UE#1.

If the SCC AC determines not to apply the improved SRVCC scheme, in Step 3, the SCC AS may not set the above-mentioned ATU-STI and C-MSISDN in "INVITE/Transfer Info" which is transmitted to the I/S-CSCF.

In such a case, in Step 4, the I/S-CSCF may not set the above-mentioned ATU-STI and C-MSISDN in the "INVITE/Transfer Info" transmitted to the ATCF.

Specifically, in such a case, a process based on the SRVCC scheme specified in TS23.216 of 3GPP is performed and the ATGW does not perform the switching of the voice communication path between the UE#1 and the UE#2.

Here, without performing the process described above, the ATCF may determine whether or not to set the ATGW as an anchor point for switching paths on the voice communication path between the UE#1 and the UE#2, considering the SRVCC capability of the UE#1 and other factors.

Modification 2

In the following, with reference to FIG. 11, a mobile communication system according to Modification 2 of the first embodiment described above will be described with a focus on differences from the mobile communication system according to the first embodiment described above.

A registration process of UE#1 with an IMS in the mobile communication system in Modification 2 will be described with reference to FIG. 11.

Figure 11:
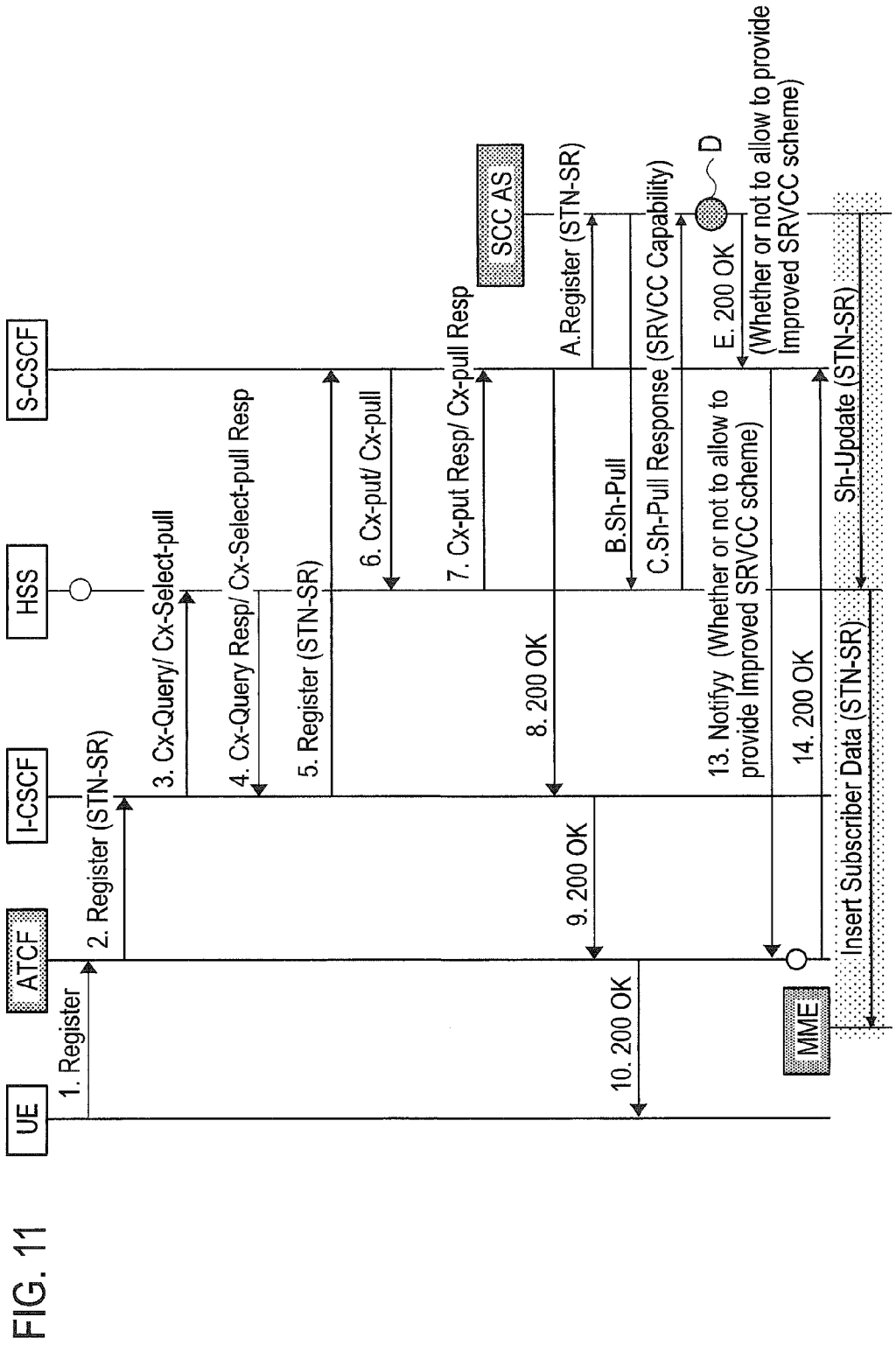
FIG. 11 is a sequence diagram describing operations of a mobile communication system according to Modification 2 of the present invention.
Figure 12:
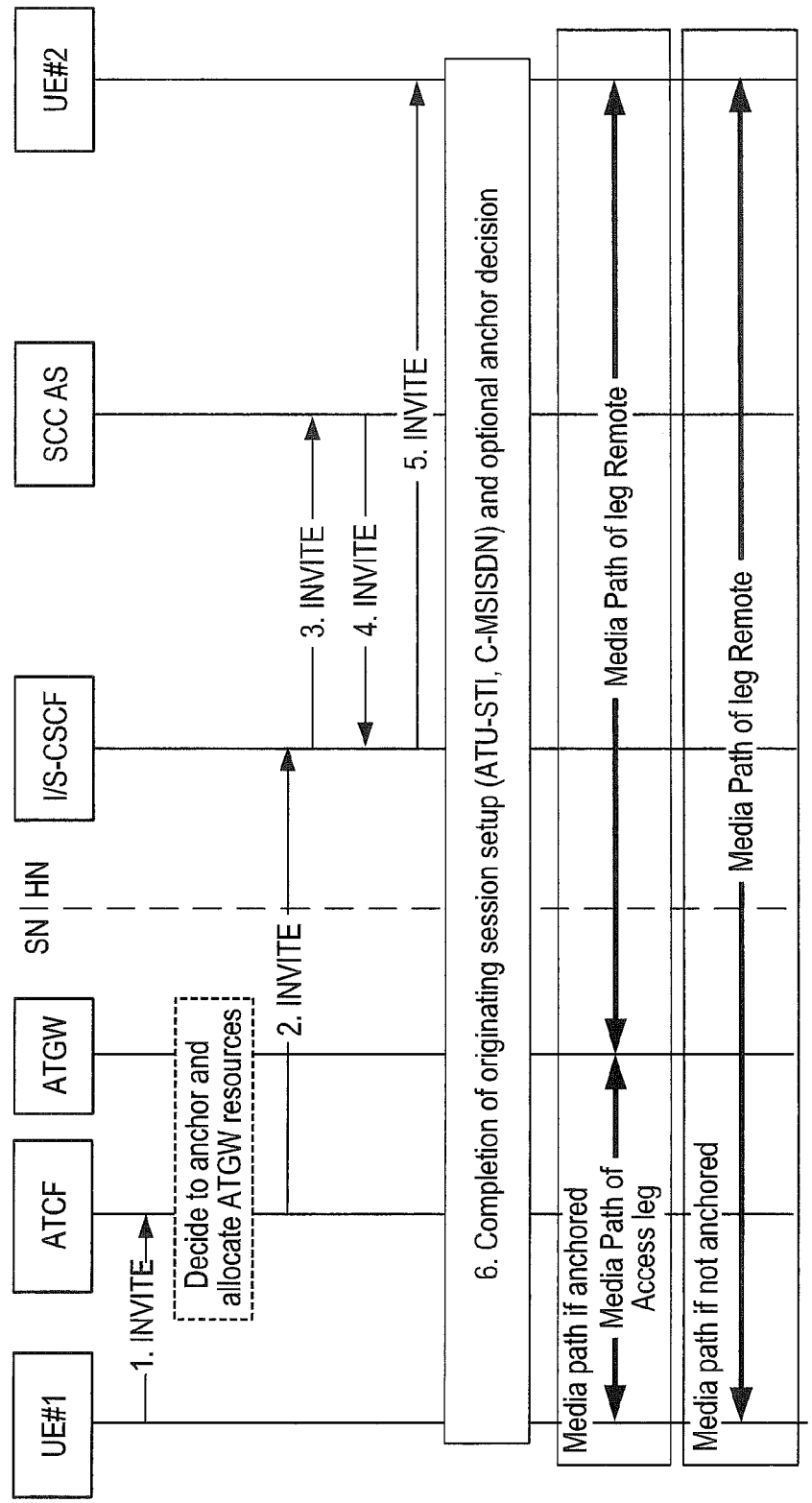
FIG. 12 is a sequence diagram describing operations of a conventional mobile communication system.
Figure 13:
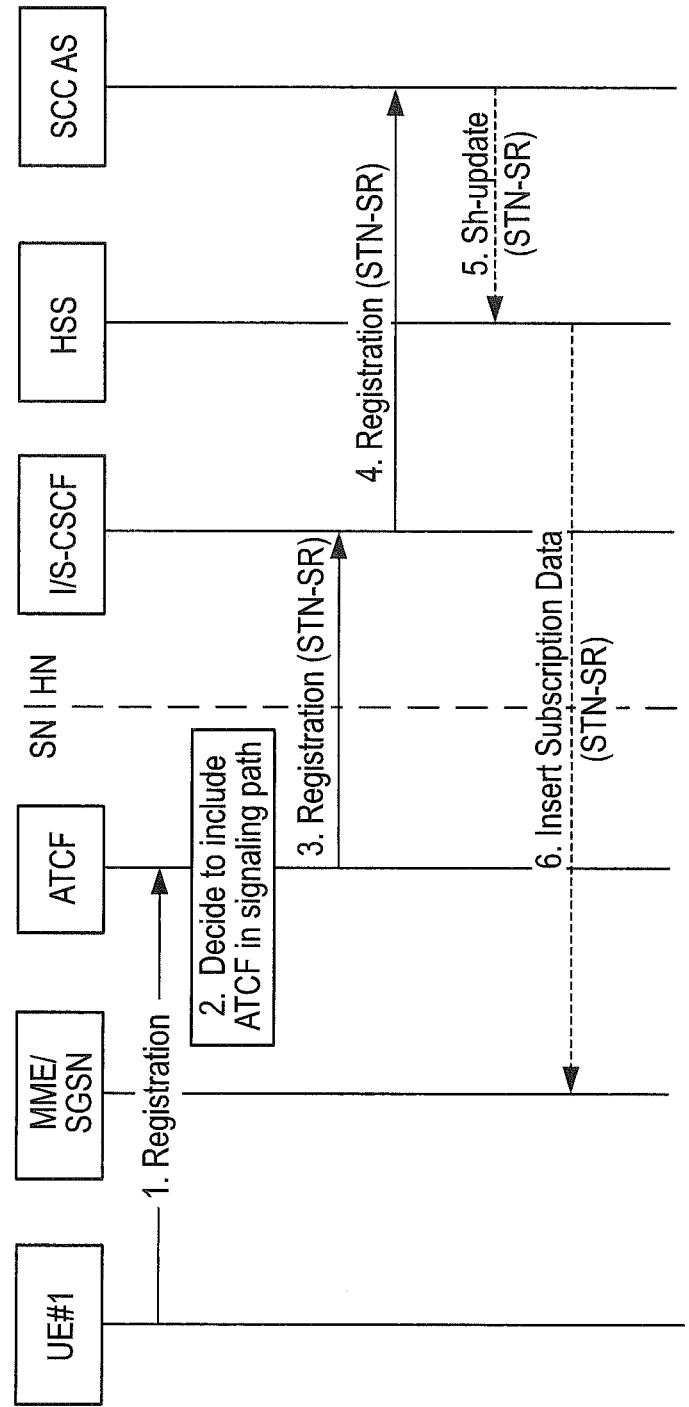
FIG. 13 is a sequence diagram describing operations of a conventional mobile communication system.

As shown in FIG. 11, operations from Steps 1 to 6 are the same as those in Steps 1 to 6 shown in FIG. 5.

In Step 7, an HSS transmits "Cx-put Resp/Cx-pull Resp" to an S-CSCF. Here, the HSS may or may not notify the S-CSCF of SRVCC capability of the UE#1 through "Cx-put Resp/Cx-pull Resp".

The S-CSCF transmits "200 OK" to an I-CSCF in Step 8, the I-CSCF transmits "200 OK" to the ATCF in Step 9, and the ATCF transmits "200 OK" to the UE#1 in Step 10. Here, it is assumed that the "200 OK" in Steps 8 and 9 does not contain the SRVCC capability of the UE#1.

However, if the S-CSCF receives the SRVCC capability of the UE#1 in Step 7, the SRVCC capability of the UE#1 may be notified to the ATCF by the "200 OK".

On the one hand, the S-CSCF transmits "Register (STN-SR)" to the SCC-AS in Step A.

Here, if the S-CSCF acquires the SRVCC capability of the UE#1 through "Cx-put Resp/Cx-pull Resp" in Step 7, the S-CSCF may notify the SCC-AS of the SRVCC capability of the UE#1 by the "Register (STN-SR)" in Step A.

On the one hand, if the SCC AS does not acquire the SRVCC capability of the UE#1 through "Cx-put Resp/Cx-pull Resp" in Step 7, the SCC AS may acquire the SRVCC capability of the UE#1 from the HSS in Steps B and C.

In Step D, the SCC AS determines whether switching with the improved SRVCC scheme may be performed in the visitor network of the UE#1, considering not only the SRVCC capability of the UE#1 but also a subscriber profile which the SCC AS retains or a subscriber profile which it acquires from the HSS and the like, an operator policy, and the like.

In addition, when receiving "Sh-Pull" in Step B, the HSS may notify the SCC AS, in Step C, of whether the switching with the improved SRVCC scheme may be performed in the visitor network of the UE#1, considering the SRVCC capability of the UE#1 which it retains, the subscriber profile, operator policy and the like.

In Step E, the SCC AS transmits "200 OK" to the S-CSCF. Here, the SCC AS may notify the S-CSCF through such "200 OK" of a determination result on whether the switching with the improved SRVCC scheme may be performed in the visitor network of the UE#1.

In addition, the SCC AS may transmit "Notify" to the S-CSCF and notify it through such "Notify" of the determination result on whether the switching with the improved SRVCC scheme may be performed in the visitor network of the UE#1.

In Step 13, the S-CSCF transmits "Notify" to the ATCF. Here, the S-CSCF may notify the ATCF through such "Notify" of the determination result on whether the switching with the improved SRVCC scheme may be performed in the visitor network of the UE#1, and such ATCF may retain such a determination result.

In Step 14, the ATCF transmits "200 OK" to the S-CSCF.

In addition, Steps 13 and 14 may be performed only when the determination result indicating that the switching with the improved SRVCC scheme may be performed in the visitor network of the UE#1 is notified in Step E.

In addition, after the processing in Step E completes, the S-CSCF may notify the ATCF of the determination result on whether the switching with the improved SRVCC scheme may be performed in the visitor network of the UE#1, through "200 OK" in Step 8, instead of the processing in Steps 13 and 14.

The SCC AS may transmit "Sh-Update" only when the UE#1 supports the SRVCC scheme or when the SCC AS determines that the switching with the improved SRVCC scheme may be performed in the visitor network of the UE#1. When the "Sh-Update" is transmitted, the HSS transmits "Insert Subscriber Data" for updating the "STN-SR" to the MME.

With the mobile communication system according to the embodiment, in the registration process of the UE#1 with the IMS, the SCC AS can acquire the SRVCC capability of the UE#1. Since this enables the ATCF to relay an SIP signal when the improved SRVCC scheme cannot be used in voice communications between the UE#1 and the UE#2, wasting of resources of the ATCF can be prevented. In addition, in such a case, since the ATGW is not allocated, either, wasting of resources of the ATGW can also be prevented.

The characteristics of the embodiment described above may be represented as follows.

A first characteristic of the embodiment is a mobile communication method in a mobile communication system which includes an E-UTRAN (first radio access network not supporting circuit-switched communications), UTRAN/GERAN (second radio access network supporting circuit-switched communications), and IMS (service control network), and which is capable of being set to switch a voice communication path between UE#1 and UE#2 from a path via E-UTRAN to a path via UTRAN/GERAN in an ATGW (anchor node) in a visitor network of the UE#1 (first mobile station), and is summarized in that the method includes the steps of: causing an MME (mobility management node) in the visitor network of the UE#1 to acquire SRVCC capability (capability) of the UE#1 and to notify an HSS (subscriber management server) of the SRVCC capability of the UE#1 in an attach process or location registration process of the UE#1; and causing an ATCF (control node) which controls the ATGW to acquire the SRVCC capability of the UE#1 in a registration process of the UE#1 with the IMS.

In the first characteristic of the embodiment, in an originating process from the UE#1 to the UE#2 or terminating process from the UE#2 to the UE#1, the method may further include a step of causing the ATCF to determine whether or not to set the ATGW as an anchor node for switching of the voice communication path between the UE#1 and the UE#2 based on the SRVCC capability of the UE#1.

In the first characteristic of the embodiment, the method may further include a step of determining whether or not to exclude the ATCF from a call control signal (originating signal from the UE#1 to the UE#2 or terminating signal from the UE#2 to the UE#1, for example) between the UE#1 and the UE#2, based on the SRVCC capability of the UE#1, in the registration process of the UE#1 with the IMS.

In the first characteristic of the embodiment, the method may further include a step of causing an SCC AS (application server) in the IMS to acquire the SRVCC capability of the UE#1 and to determine whether or not to transmit information (STN-SR) indicating the ATCF to the MME based on the SRVCC capability of the UE#1 in the registration process of the UE#1 with the IMS.

A second characteristic of the embodiment is a mobile communication system including an E-UTRAN, UTRAN/GERAN, and IMS, and being capable of being set to switch a voice communication path between UE#1 and UE#2 from a path via the E-UTRAN to a path via the UTRAN/GERAN in an ATGW in a visitor network of the UE#1, and is summarized in that an MME in the visitor network of the UE#1 is configured to acquire SRVCC capability of the UE#1 and notify an HSS of the SRVCC capability of the UE#1 in an attach process or location registration process of the UE#1, and that an ATCF which controls the ATGW is configured to acquire the SRVCC capability of the UE#1 in a registration process of the UE#1 with the IMS.

In the second characteristic of the embodiment, the ATCF may be configured to determine whether or not to set the ATGW as an anchor node for switching the voice communication path between the UE#1 and the UE#2 based on the SRVCC capability of the UE#1, in an originating process from the UE#1 to the UE#2 or terminating process from the UE#2 to the UE#1.

In the second characteristic of the embodiment, the system may be configured to determine whether or not to exclude the ATCF from a transfer path of a call control signal (originating signal from the UE#1 to the UE#2 or terminating signal from the UE#2 to the UE#1, for example) between the UE#1 and the UE#2, based on the SRVCC capability of the UE#1, in the registration process of the UE#1 with the IMS.

In the second characteristic of the embodiment, the SCC AS in the IMS may be configured to acquire the SRVCC capability of the UE#1 and to determine whether or not to transmit information indicating the ATCF to the MME based on the SRVCC capability of the UE#1, in the registration process of the UE#1 with the IMS.

Note that, operations of the MSC server, CS-MGW, MME, SGSN, S-GW, P-GW, P-CSCF, I/S-CSCF, SCC AS, ATCF, ATGW, HSS, MSC, UE#1, UE#2, and eNB, described above, may be performed by hardware, may be performed by a software module executed by a processor, or may be performed by a combination of both.

The software module may be provided in any type of storage medium such as a RAM (Random Access Memory), flash memory, ROM (Read Only Memory), EPROM (Erasable Programmable ROM), EEPROM (Electronically Erasable and Programmable ROM), register, hard disk, removal disk, or CD-ROM.

Such a storage medium is connected to a processor so that the processor can read and write information from and to the storage medium. In addition, such a storage medium may be integrated in a processor. In addition, such a storage medium and processor may be provided in an ASIC. Such an ASIC may be provided in an MSC server, CS-MGW, MME, SGSN, S-GW, P-GW, PCSCF, I/S-CSCF, SCC AS, ATCF, ATGW, HSS, MSC, UE#1, UE#2, or eNB. In addition, such a storage medium and processor may be provided in an MSC server, CS-MGW, MME, SGSN, S-GW, P-GW, P-CSCF, I/S-CSCF, SCC AS, ATCF, ATGW, HSS, MSC, UE#1, UE#2, or eNB as discrete component.

Although the present invention has been described so far in detail with the embodiments described above, it is apparent to those skilled in the art that the present invention is not limited to the embodiments described herein. The present invention can be carried out as a modification or alteration without departing from the intent and scope of the present invention to be defined by a description of the claims. Therefore, the description of the specification is intended to provide an exemplary description and does not have any limiting sense to the present invention.

INDUSTRIAL APPLICABILITY

As described above, the present invention can provide a mobile communication method and a mobile communication system which can prevent wasting of resources of an ATGW or ATCF.

EXPLANATION OF REFERENCE NUMERALS

UE#1, UE#2 Mobile station
MME Mobility management node
SGSN Packet switching device
MSC Circuit switching device
S-GW, P-GW Gateway device

The invention claimed is:

1. A mobile communication method in a mobile communication system which includes a first radio access network not supporting circuit-switched communications, a second radio access network supporting circuit-switched communications, and a service control network, and which is capable of being set to switch a voice communication path between a first mobile station and a second mobile station from a path via the first radio access network to a path via the second radio access network in an anchor node in a visitor network of the first mobile station, the method comprising the steps of:

causing a mobility management node in the visitor network to acquire capability of the first mobile station and to notify a subscriber management server of the capability of the first mobile station in an attach process or a location registration process of the first mobile station, and causing a control node which controls the anchor node to acquire the capability of the first mobile station in a registration process of the first mobile station with the service control network.

2. The mobile communication method according to claim 1, further comprising a step of causing the control node to determine whether or not to set the anchor node for switching the voice communication path based on the capability of the first mobile node, in an originating process from the first mobile station to the second mobile station or a terminating process from the second mobile station to the first mobile station.

3. The mobile communication method according to claim 1, further comprising a step of causing an application server in the service control network to acquire the capability of the first mobile station and to determine whether or not to transmit information indicating the control node to the subscriber management server based on the capability of the first mobile station, in the registration process of the first mobile station with the service control network.

4. A mobile communication system comprising a first radio access network not supporting circuit-switched communications, a second radio access network supporting circuit-switched communications, and a service control network, the mobile communication system being capable of being set to switch a voice communication path between a first mobile station and a second mobile station from a path via the first radio access network to a path via the second radio access network in an anchor node in a visitor network of the first mobile station, wherein a mobility management node in the visitor network is configured to acquire capability of the first mobile station and notify a subscriber management server of the capability of the first mobile station, in an attach process or location registration process of the first mobile station, and a control node which controls the anchor node is configured to acquire the capability of the first mobile station in a registration process of the first mobile station with the service control network.

5. The mobile communication system according to claim 4, wherein the control node is configured to determine whether or not to set the anchor node for switching the voice communication path, based on the capability of the first mobile station, in an originating process from the first mobile station to the second mobile station or terminating process from the second mobile station to the first mobile station.

6. The mobile communication system according to claim 4, wherein an application server in the service control network is configured to acquire the capability of the first mobile station and to determine whether or not to transmit information indicating the control node to the subscriber management server based on the capability of the first mobile station, in the registration process of the first mobile station with the service control network.

7. A control node in a mobile communication system which includes a first radio access network not supporting circuit-switched communications, a second radio access network supporting circuit-switched communications, and a service control network, and which is capable of being set to switch a voice communication path between a first mobile station and a second mobile station from an path via the first radio access network to a path via the second radio access network in an anchor node in a visitor network of the first mobile station, the control node controlling the anchor node, wherein the control node is configured to determine whether or not to set the anchor node for switching the voice communication path, based on the capability of the first mobile station, in a terminating process from a second mobile station to the first mobile station.

8. An application server in a service control network in a mobile communication system which includes a first radio access network not supporting circuit-switched communications, a second radio access network supporting circuit-switched communications, and the service control network, and which is capable of being set to switch a voice communication path between a first mobile station and a second mobile station from a path via the first radio access network to a path via the second radio access network in an anchor node in a visitor network of the first mobile station, wherein the application server is configured to acquire the capability of the first mobile station and to determine whether or not to transmit information indicating a control node to a subscriber management server based on the capability of the first mobile station in a registration process of the first mobile station with the service control network.

9. A mobility management node in a visitor network in a mobile communication system which includes a first radio access network not supporting circuit-switched communications, a second radio access network supporting circuit-switched communications, and a service control network, and which is capable of being set to switch a voice communication path between a first mobile station and a second mobile station from a path via the first radio access network to a path via the second radio access network in an anchor node, with SRVCC scheme, in a visitor network of the first mobile station, wherein the mobility management node in the visitor network is configured to acquire SRVCC capability of the first mobile station and notify a subscriber management server of the SRVCC capability of the first mobile station in an attach process of the first mobile station, the mobility management node is configured to notify the subscriber management server of the SRVCC capability of the first mobile station upon detecting that the SRVCC capability of the first mobile station is changed, and the SRVCC capability of the first mobile station is information indicating that the first mobile station supports the SRVCC scheme or information that the first mobile station does not support the SRVCC scheme.

10. The mobility management node according to claim 9, wherein the mobility management node is configured to receive information indicating a control node which controls the anchor node from the subscriber management server.

* * * * *